United States Patent Office 3,336,066
Patented Aug. 15, 1967

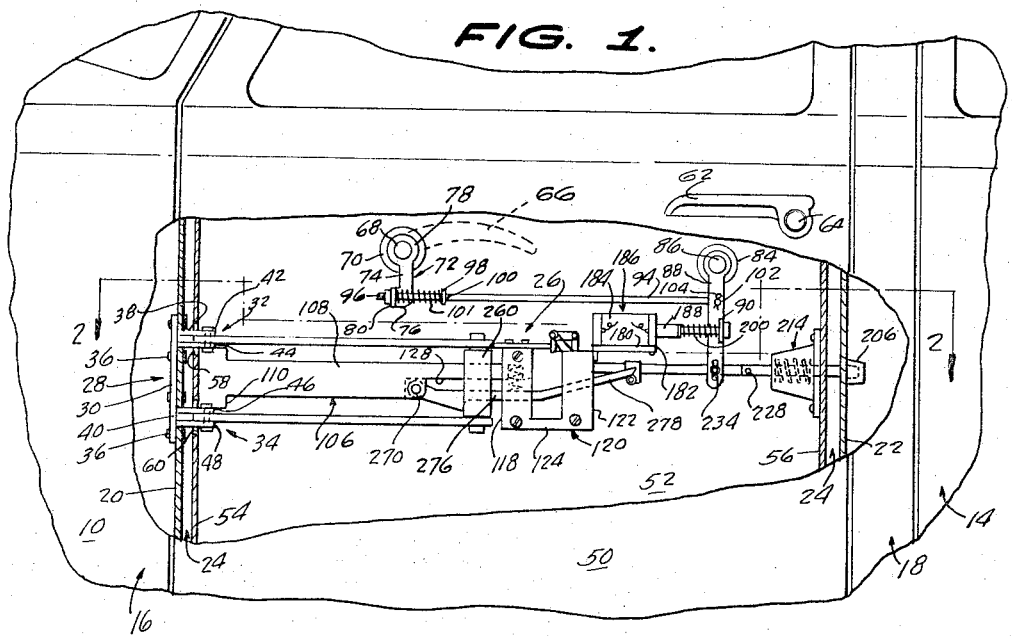

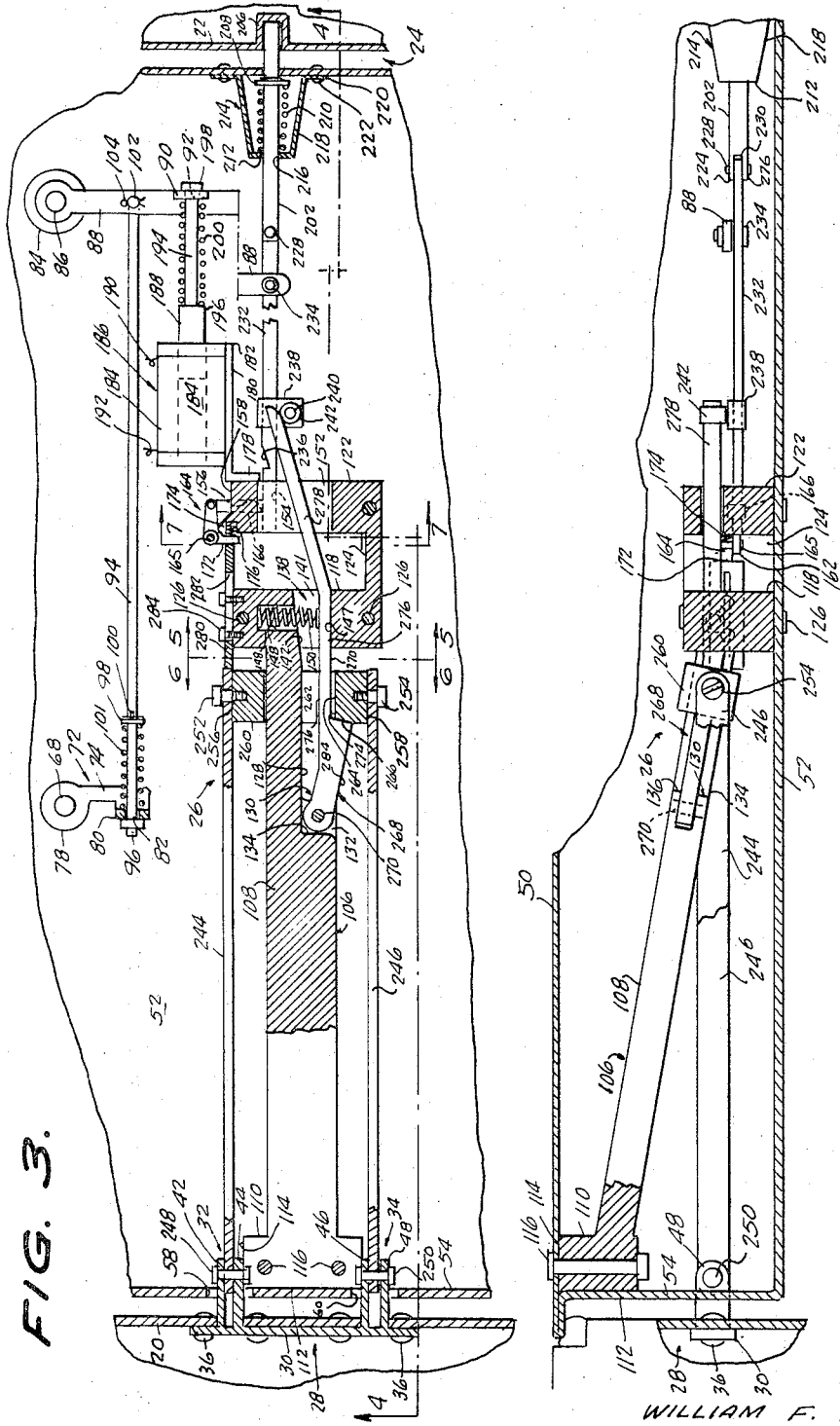

3,336,066
AUTOMOBILE DOOR LOCK
William F. Knapp, P.O. Box 5073,
Bossier City, La. 71010
Filed Aug. 13, 1965, Ser. No. 479,368
5 Claims. (Cl. 292—333)

ABSTRACT OF THE DISCLOSURE

An automobile safety door lock for a hollow automobile door consisting of a horizontal inclined bar fixedly-secured in the door between the outer corner adjacent the door hinge and the inner wall of the hollow door and extending through an aperture in a locking bracket carried by a pair of top and bottom link arms pivoted to the door jam adjacent the door hinge on a vertical axis spaced inwardly from said outer corner. The door has a sliding horizontal locking bolt which is either manually or electrically-operated. The inclined bar has a locking lever pivoted thereto which has a depending locking shoulder. The locking lever extends through the aperture in the locking bracket and is spring-biased downwardly to retain the locking shoulder in engagement with the bottom edge of the aperture, so as to prevent opening of the door. The sliding bolt carries a roller which is cammingly-engageable under the free end of the locking lever to lift the locking lever and disengage the shoulder from the bottom edge of the aperture when the locking bolt is retracted in normal operation, whereby to then allow the door to open. A catch lever on the inner end of the inclined bar has a pivoted depending catch arm slidably-engaging through the top of the inner end portion of the inclined bar and being lockingly-engageable with a notch in the locking bolt to retain the locking bolt retracted while the door is open. The inner end of the upper link arm is engageable with the catch lever to retract the catch arm and release the locking bolt when the door is closed.

---

This invention relates to the general field of mechanical locking devices and, more specifically, the instant invention pertains to door locking means for the doors of automotive vehicles and the like.

It is commonplace to read in any current newspaper or to learn from other news media of death or serious injury to a person or persons riding in an automobile or similar vehicle, and wherein death and/or personal injury was the direct consequence of the inadvertent and accidental opening of the doors or the vehicle permitting the driver and the passengers of the vehicle to be thrown therefrom to fall upon the road and, in some cases, to be crushed by the automobile as the same rolls. Such injuries generally occur when the doors of the vehicle are sprung from their normally closed positions to an open position permitting the occupants of the car to be thrown through the ingress and egress passageway. In such cases, the doors of the vehicle are sprung to their open position since no means is provided to hold the doors in their closed positions once the door lock bars have escaped their respective keepers.

While many attempts have been made in prior art devices to overcome this hazardous condition, no locking means has heretofore been devised to obviate this potentially dangerous situation.

It is, therefore, one of the primary objects of this invention to provide safety locking means for automobile or other vehicle doors which will positively lock the vehicle doors in their respective closed positions and to retain the same in their closed positions regardless of the position of the door lock bolt relative to its keeper.

A further object of this invention is to provide a safety locking means for vehicle doors which is operatively associated with opposite sides of the vehicle door in such a manner as to prevent the inadvertent or accidental opening thereof.

Another object of this invention is to provide a safety type automobile door lock of the type generally described supra, the door lock being adapted to serve its intended function independently of or in conjunction with existing vehicle door locking mechanisms.

This invention contemplates, as a still further object thereof, the provision of a safety automobile door lock which is non-complex in construction and assembly, inexpensive to manufacture, and which is rugged and durable in use.

Other and further objects and advantages of the instant invention will become more evident from a consideration of the following specification when read in conjunction with the annexed drawings, in which:

FIGURE 1 is a side elevational view of the conventional automobile including a door thereof, the view being partially broken away to illustrate a safety automobile door lock in side elevation constructed according to this invention;

FIGURE 2 is a top plan view of the door lock shown in FIGURE 1, FIGURE 2 being taken substantially on the line 2—2 of FIGURE 1, looking in the direction of the arrows;

FIGURE 3 is a vertical cross-sectional view, FIGURE 3 being taken substantially on the line 3—3 of FIGURE 2, looking in the direction of the arrows;

FIGURE 4 is a bottom plan view of the door lock, partially in the cross-section, FIGURE 4 being taken substantially on the line 4—4 of FIGURE 3, looking in the direction of the arrows;

FIGURE 5 is a vertical detail cross-sectional view, FIGURE 5 being taken substantially on the vertical plane of line 5—5 of FIGURE 3, looking in the direction of the arrows;

FIGURE 6 is an end elevational view of a portion of the door lock, FIGURE 6 being taken substantially on the vertical plane of line 6—6 of FIGURE 3, looking in the direction of the arrows; and FIGURE 7 is a detail cross-sectional view, FIGURE 7 being taken substantially on the vertical plane of line 7—7 of FIGURE 3, looking in the direction of the arrows.

Referring now more specifically to the drawings, reference numeral 10 designates, in general, a conventional automobile or other similar vehicle provided with the usual hingedly connected front and rear doors 12, 14, respectively, the doors 12, 14 being adapted for swinging movement from their respective closed to open positions, and vice-versa, on the usual hinge means which are herein generally designated by reference numeral 15. Since the vehicle chassis including the door construction, the hinging support means therefor, and other component elements of the vehicle 10 are all old and well known in the art, description and illustration thereof will be held to that minimum as will provide a suitable background to the understanding of the present invention. Hence, and referring primarily to FIGURES 1 and 2 of the drawings, reference numerals 16, 18 each denote structural chassis members of the vehicle 10, the members 16, 18 including, respectively, oppositely disposed upright door jams 20, 22, the jambs 20, 22 defining the opposed sides of an ingress and egress opening 24, all in the usual manner. As has been stated above, the present invention is directed through the provision of safety locking means or mechanisms for the doors 12, 14, and since the application of the locking device means is substantially the same for each door, the door 12 has been here selected for description in conjunction with the locking means, device or mechanism constructed in accordance with the teachings of this invention and to which has been ascribed the general reference numeral 26.

The locking means 26 includes an integrally formed upright substantially C-shaped bracket 28 having an upright elongated substantially rectangular bight portion 30 from the opposed ends of which laterally project, in the same direction, a pair of vertically spaced side arms 32, 34. The bight portion 30 is fixedly secured as by rivets 36 to the innerside of the door jamb 20, and the side arms 32, 34 extend transversely through vertically spaced openings 38, 40 formed in the door jamb 20 and project beyond the outer side thereof. As is clearly seen in FIGURES 1 and 3, the side arms 32, 34 each comprise a pair of vertically spaced and substantially parallel tongues 42, 44 and 46, 48, respectively.

The door 12 comprises the usual laterally spaced and upright front and back panels 50, 52, respectively, and the spaced and upright side frame members 54, 56. The side frame member 54 (see FIGURES 1 and 3) is formed with a pair of vertically spaced transversely extending substantially rectangular openings 58, 60 through which the outer ends of the side arms 32, 34 are loosely extended. The front panel 50 has fixedly secured thereon the usual hardware including the fixed handle 62 having a push-button type actuating means including a push-button switch 64 of known construction incorporated therein. A conventional manually operable door latch operating handle 66 projects from the back panel 52 and is fixedly secured to one end of the shaft 68, the other end of the shaft 68 traversing the back panel 52 and is suitably journaled in a bushing 70. Reference numeral 72 indicates an elongated substantially L-shaped lever having a leg portion 74 and a foot portion 76. The outer end of the leg portion 74 terminates in a large annular head 78 fixed on the shaft 68 for rotation therewith with the leg portion 74 depending therefrom. The outer end of the foot portion 76 terminates in a laterally turned normally upright lug 80 having its free end extending towards the front panel 50. To serve a function to be described, the lug 80 is essentially apertured as at 82. A bushing 84 is secured to the inner side of the back panel 52 and journals for rotation therein one end of a stub shaft 86, the other end of the shaft 86 being fixedly secured to the upper end of a depending substantially rectangular lever 88. The lever 88, intermediate its upper and lower ends, is integrally formed with the laterally extending flange 90 having its free end projecting towards the front panel 50, flange 90 being provided with a centrally located aperture 92.

One end of an elongated substantially cylindrical shaft 94 is loosely received in the aperture 82 for reciprocation therethrough. This end of the shaft 94 is provided with an enlarged head 96 at one side of the lug 80, the head 96 serving as abutment means limiting the movement of the shaft 94 in one direction relative to the lug 80, and the shaft 94 adjacent to but spaced from the other side of the lug 80 has a thrust collar 98 slidably mounted thereon, the collar 98 being held against axial movement in one direction on the shaft 94 as by the radially projecting stop pin 100. A helicoidal spring 101 surrounds the shaft 94 with end and end thereat abuting the the collar 98 and its other end engages the adjacent side of the lug 80 whereby the shaft 94 is constantly biased for movement to the right as viewed in FIGURE 3. The other end of the shaft 94 terminates in a laterally turned shaft arm 102 which extends transversely through the lever 88 intermediate the stub shaft 86 and flange 90. As is seen in FIGURES 1 and 3, the shaft arm 102 is free to rotate in the lever 88 and is held against accidental or inadvertent disconnection therefrom by means of a cotter pin 104.

Reference numeral 106 designates an elongated compound substantially rectangular bar disposed between the front and back panels 50, 52, respectively, and the side frame members 54, 56, the bar 106 having a centrally positioned elongated section 108 also rectangular in cross-sectional configuration. The central section 108 terminates at one of its ends in an enlarged integrally formed laterally projecting substantially rectangular boss 110 having its longitudinal axis extending at an obtuse angle with respect to the longitudinal axis of the bar 106. The boss 110 includes a flattened or planar side 112 which is imposed against an adjacent side of the side frame member 54, and the boss 110 also includes a substantially planar end 114 imposed against the back panel 50, the planar side 112 and end 114 being disposed at right angles relative to one another. As is seen in FIGURES 2 and 4, the boss 110 is fitted in a corner formed at the intersection of the front panel 50 with the side frame member 54 and may be riveted as at 116 or otherwise fixedly secured to the inner side of the front panel 50. The other end of the bar 108 continues in an integrally connected substantially rectangular first side arm 118 of a depending offset substantially U-shaped bracket 120 which includes an oppositely disposed spaced and parallel second side arm 122. The lower ends of the first and second side arms 118, 120 are integrally connected to the opposed ends of the bight element 124. The side arm 118 may be fixedly secured to the back panel 52 by screws 126 or by other conventional means. The offset of the bracket 120 is such that the longitudinal axis of the bight element 124 is disposed at an obtuse angle relative to the longitudinal axis of the bar 106 so that those portions thereof juxtapose relative to the adjacent portions of the panel 52 lying flush thereagainst.

The outer terminal end of the bar 108 joins the side arm 118 adjacent to but spaced below the upper end thereof, and as is seen in FIGURE 3, the underside of the bar 108 at its outer terminal end is undercut at 128 to form a shoulder 130 facing the adjacent side of the side arm 118. The shoulder 130 is centrally grooved at 132 to open downwardly and also into the undercut 128, the groove 132 inherently giving rise to a pair of laterally spaced ears 134, 136 to which further reference will be made.

As is shown in FIGURE 3, the side arm 118 is provided with a transversely extending substantially rectangular opening 138 having oppositely disposed laterally spaced and parallel upright sides 140, 141 (see FIGURE 5), and opposed vertically spaced upper and lower ends 142, 143. A channel 144 having sides 145, 146 and a lower end 147 opens upwardly into the lower end of the opening 138 with the plane of the upper end 142 being downwardly inclined with respect to the plane of the undercut 128 which it meets at an obtuse angle. The planes of the lower ends 142 and 147 are normally horizontal. As is clearly shown in FIGURE 3, the side arm 118 is formed with a substantially cylindrical upright spring keeper socket 148 and receives one end of a helicoidal spring 150, the other end of the spring 150 extending into the opening 138 and channel 144 to serve a function to be described, infra.

The side arm 122 is provided with a vertically elongated first passage 152 (see FIGURE 7) extending therethrough, and the first passage 152 is aligned with the opening 138 and channel 144 formed in the side arm 118. A second elongated passage 154 extends horizontally through the side arm 122 parallel to the first passage 152 but is laterally offset relative thereto and is disposed adjacent the upper end thereof. A third vertically extending substantially rectangular passage 156 opens at its lower end into the passage 154 and is in open communication at its upper end in the plane of the upper end 158 of the side arm 122. As is seen in FIGURES 2 and 7, the upper end 158 of the side arm 122 is formed with a pair of upstanding laterally spaced and substantially parallel standards 160, 162 between which a bell-crank lever 164 is pivotally mounted on a pivot pin 165. A vertically elongated substantially rectangular detent 166 has one of its ends pivotally connected at 168 on one arm 170 while the other end thereof is received for reciprocation in the passage 156 and extends across the second passage 154 to serve a function to be described.

The second arm 172 of the bell-crank lever 164 depends from the first arm 170 at right angles with respect thereto and confronts and is engaged at its inner side by one end of a helicoidal spring 174 normally held under compression. The other end of the spring 174 is received within a substantially cylindrical spring keeper socket 176. Thus, and with reference to FIGURE 3 of the drawings, the bell-crank lever 164 is constantly biased for movement in a clockwise direction about its pivot pin 165. Also, to the upper end of the side arm 122 is fixedly secured (by conventional means, not shown) the foot portion 178 of an L-shaped bracket 180 having elongated horizontal leg portion 182. Fixedly connected on the leg portion 182 is winding 184 of a solenoid 186 having a reciprocable cylindrical armature 188. The winding 184 is connected by leads 190, 192 and an electrical circuit (not shown) which is energized when the push-button switch 64 is depressed in the usual manner.

The outer end of the armature 188 is integral with one end of an elongated shaft 194 having a reduced diameter and forming a shoulder 196 at its inner end. The other or outer end of the shaft 194 extends loosely through the opening 92 for reciprocation through the flange 90, and this end of the shaft 194 terminates in an enlarged stop head 198 which is adapted to engage the remotely disposed side of the flange 90. An elongated helicoidal spring 200 under compression surrounds the shaft 194 with an end abutting against the shoulder 196 and its other end in engagement with the adjacent side of the flange 90. This arrangement is such that as the manually operable handle 66 is pivoted in a clockwise direction, reference being made to FIGURE 1 of the drawings, the lever 72 moves in the same direction and in so moving the lug 80 bears against the enlarged head 96 exerting a force thereon that draws the shaft 94 to the left. The spring 101, however, remains under its normal tension since the axial distance between the adjacent sides of the collar 98 and the lug 80 remains substantially the same.

The axial shifting of the shaft 94 causes the lever 88 and its stub shaft 86 to rotate in a clockwise direction and in so moving, the flange 90 compresses the spring 200 between the shoulder 196 and the adjacent side of the flange 90. This last movement may or may not be accompanied by an axial shifting of the shaft 194 and the armature 188 to the left, as viewed in FIGURE 3, depending upon how loose the connection is between the flange 90 and the shaft 94. Insofar as the operation of the device 10 is concerned, it makes no difference if the shaft 94 and armature 88 shift or remain stationary upon actuation of the handle 66 in the direction described above. Upon release of the handle 66 and the restoration thereof to its normal position shown in FIGURE 1, the force of the spring 101 acting between the collar 98 and the adjacent side of the flange 80, tends to cause the head 96 to remain in contact with the lug 80 and to follow its counterclockwise movement, thereby causing the shaft 94 to shift to the right as viewed in FIGURE 3, thereby restoring the lever 88 to its shown position. At the same time, the spring 200 acting on the flange 90 adds its force to the other forces tending to turn the lever 88 in a counterclockwise direction to return the same to its depending position shown in FIGURES 1 and 3.

It should also be noted that actuation of the push-button switch 64 to energize the electrical circuit which includes the winding 184 of the solenoid 186 will cause the armature 188 to move inwardly of the winding 184 drawing with it the shaft 194. The shaft 194 in so moving causes the head 198 to engage against the flange 90 whereby the lever 88 is again rotated in a clockwise direction. Rotation of the lever 88 in this direction causes the shaft 94 to move axially toward the left as viewed in FIGURE 3 and in so moving compresses the spring 101, it being assumed, of course, that the lever 72 remains stationary. When the solenoid 186 is deenergized, the springs 101 and 200 cooperate to return the lever 88 to its depending position.

From the foregoing discussion, it should be clearly understood that the lever 88 may be caused to operate through the actuation of the handle 66 or through the energization of the circuit to the solenoid 186 through the push-button switch 64.

Reference numeral 202 denotes an elongated substantially rectangular lock rod having an end thereof mounted for reciprocation through an opening 204 formed in the side frame member 56. As is seen in FIGURE 3, this end of the lock rod 202 projects beyond the other side of the side frame member 56 and is received within a lock rod keeper socket 206 formed in the jamb 22. The lock rod 202 adjacent its aforementioned end is formed with a fixed cylindrical flange 208 that serves the combined function of stop means for limiting the movement of the rod 202 to the right as viewed in FIGURE 3 and as an abutment for one end of a helicoidal spring 210 which surrounds the lock rod 202 and abuts at its other end against an end wall 212 aligned in the plane of a frustum of a frusto-conical spring shield 214. The end wall 212 is centrally apertured at 216 to reciprocably receive the other end of the lock rod 202 therethrough. The lock rod 202 is, thus, constantly biased for movement towards the right as viewed in FIGURE 3 to assume its locking position shown therein. The shield 214 also includes the conical side wall 218 which terminates at its base end in an outwardly flaring circumferential flange 220 which lies flush against the inner side of the side frame member 56 and is secured thereto by rivets 222. The other end of the lock rod 202 is bifurcated to provide a pair of spaced and parallel lobes 224, 226 (see FIGURE 4) and carries a traverse pivot pin 228 on which is pivotally connected a tongue 230 that projects longitudinally from one end of an elongated substantially rectangular latch bar 232.

The latch bar 232 adjacent one end thereof is pivotally conected on a pivot pin 234 to the lower end of the lever 88, and the other end of the latch bar 232 is reciprocably received within the passage 154. With the latch bar 232 and lock rod 202 in their respective operative locked positions shown in FIGURE 3, it is seen that the other end of the latch bar 232 is formed with an upwardly opening notch 236 normally positioned externally of the side arm 122 but shiftable with the latch bar 232 to a position below the lower end of the detent 166 which, under conditions set forth below, is adapted to lock therein. Fixedly secured on the latch bar 232 adjacent the notch 236 is a substantially rectangular block 238 having a shaft 240 projecting laterally from a side thereof on which is mounted a roller 242.

Reference numerals 244, 246 denote, respectively, a pair of top and bottom flat elongated substantially rectangular braces of which one end of the brace 244 is pivotally connected on pivot pin 248 between the tongues 42, 44, and one end of the brace 246 is similarly connected on pivot pin 250 between the tongues 46, 48. The braces 244, 246 extend in spaced parallel relationship relative to one another from the respective pivotal connections and, at their respective other adjacent ends are pivotally connected by screws 252, 254 to the upper and lower ends 256, 258 of a vertically elongated substantially rectangular block 260. The block 260 is formed with a horizontal transversely extending passage 262 having a normally horizontal lower end wall 264 and an upwardly and inwardly inclined beveled shoulder 266 that intersects the plane of the lower end 264.

Reference numeral 268 designates an elongated substantially flat and rectangular lock arm having an end disposed between the ears 134, 136 on which it is pivotally connected by a pivot pin 270. The lock arm 268 is undercut at 272 to form an upwardly inclined shoulder 274 which normally locks against the shoulder 266 with the adjacent faces of the shoulders lying in the coincident planes. The undercut 272 gives rise to an integrally connected central portion 276 (see FIGURE 3) which extends loosely through the passage 262 and channel 144. The outer end of the central section 276 is abutted by the lower end of the spring 150, and the other end of the central section 276 terminates in an end section 278 having its longitudinal axis disposed at an obtuse angle relative to the longitudinal axis of the central section 276 and, as seen in FIGURE 3, the end section 278 extends completely through the passage 152 and the outer end thereof rests on the roller 242. From the description offered above, it is clear that the end section 278 acts in the nature of a cam causing the lock arm 268 to pivot in a counterclockwise direction as the latch bar 232 is moved to the left as viewed in FIGURE 3. It should be understood that the block 260 is slidably mounted on the compound bar 108 to serve a function to be described.

Reference numeral 280 indicates an elongated substantially flat rectangular slide having a centrally located longitudinally extending substantially rectangular slot 282 formed therein. The slide 280 is mounted for reciprocation on the upper end of the side arm 118 as by screws 284. As is seen in FIGURE 3, one end of the slide 280 abuts against the second arm 172 of the bell-crank lever 164 and the other end of the slide 280 abuts against the outer end of the brace 244.

Having described the component elements of this invention in detail, it is believed that the operation thereof is self-evident. However, in the interest of clarity, a brief summary thereof is offered below.

Assuming that all of the elements of the invention are in the positions illustrated in the several figures of the drawings, the door 12 is closed and locked against movement into its open position by the interlocking action of the lock rod 202 and its keeper 206 and the engagement of the shoulders 266, 274. Assuming further that it is now desired to open the door 12, the operator actuates either the handle 66 or the push-button switch 64 to cause the lever 88 to pivot in a clockwise direction as described above. Actuation of the handle 66 or energization of the solenoid 186 will cause the lock rod 202 and latch bar 232 to move to the left against the biasing force of the spring 210, the movement continuing until the free end of the lock rod 202 escapes from its keeper 206. The disengagement of the lock rod 202 from its keeper 206 will not, in and by itself, permit the door 12 to open since the shoulders 266 and 274 are still locked against one another. Consequently, as the lock rod 202 and the latch bar 232 shift to the left as viewed in FIGURE 3, the end section 278 of the lock arm 268 rides upwardly on the roller 242 causing the lock arm 268 to pivot upwardly within the passages 152, 138, 262 and channel 144, freeing the shoulders 268, 274. Now, as pressure is exerted on the door 12 to swing the same in the direction of its open position about the hinge means 15, the braces 244, 246 draw the block 260 inwardly of the compound bar 106 in such a manner that the underside 284 of the lock arm 268 slidably engages and rests on the end wall 264 of the passage 262. As the block 260 slides on the compound bar 106, the outer ends of the braces 244, 246 move away from the adjacent end of the slide 280 and frees the slide for movement to the left as viewed in FIGURE 3, this movement being initiated by the pivotal movement of the arm 172 of the bell-crank lever 164 in a clockwise direction under the influence of the helicoidal spring 174. At the time the pivotal movement of the bell-crank lever 164 takes place, the detent 166 drops into the notch 236 to lock the lock rod 202 and latch bar 232 against movement toward the right as viewed in FIGURE 3 to assume its locked position.

When it is desired to close the door 12, movement thereof towards the closed position will cause the block 260 to slide on the compound bar 106 toward the outer end thereof and to force the adjacent end of the brace 244 into engagement with confronting end of the slide 280 forcing the same to assume the position shown in FIGURE 3. As this movement of the block 260 takes place, the shoulder 274 rides downwardly on the shoulder 266 until the same are locked one against the other. This downward movement occurs under the influence of the helicoidal spring 150 which abuts the central section 276 to constantly urge the lock arm 268 for pivotal movement in a clockwise direction about the pivot pin 270, reference being made to FIGURE 3 of the drawings. As the shoulders 266, 274 reengage, the end of the brace 244 adjacent the slide 280 reengages therewith moving the slide 280 to the position shown in FIGURE 3. The other end of the slide 280 now pushes against the arm 172 causing the bell-crank lever 164 to pivot in a counterclockwise direction raising the detent 166 from within the notch 236 which, in turn, frees the latch bar 232 and lock rod 202 for movement to the right as viewed in FIGURE 3, this movement being initiated by the action of the helicoidal spring 210. It will be understood, of course, that once the handle 66 has been actuated to cause the pivotal movement of the lever 88 or the solenoid 186 is energized to effect the same movement, the handle 66 may be released and the circuit to the solenoid 186 be deenergized without in any way effecting any relative movement of the latch bar 232 once the detent 166 has entered the notch 236.

This invention is well adapted to safeguard children and other passengers riding in a conventional automotive vehicle against accidental opening of the rear doors. For example, the manually operated handle 66 could be disconnected from the mechanism and the control solenoids 186 for each of the doors of the vehicle could be tied into a single circuit operated from a common switch located on the dashboard of the vehicle.

The above-described safety lock may be installed in conjunction with the conventional door locking mechanisms as an adjunct thereto or, if desired, the device may be installed as a unit in lieu of the usual locking means.

It should also be apparent that should the vehicle be involved in an accident which causes the lock rod 202 and its keeper socket 206 to become disengaged one from the other, the door will not spring open since the block 260 remains stationary and prevents the pivotal movement thereof. Thus, it is seen that the invention provides locking means at each side of the door 12.

Having described and illustrated one embodiment of this invention in detail, it will be understood that the same is offered merely by way of example, and that this invention is to be limited only by the scope of the appended claims.

What is claimed is:
1. A safety lock for a vehicle having a chassis including a pair of opposed laterally spaced upright door jambs, a door including a pair of opposed laterally spaced front and back panels, a pair of spaced and confronting side frame members, and means pivotally connecting said door adjacent one of said side frame members on one of said door jambs, said safety lock comprising an elongated bar having an end thereof fixedly secured to said one side frame member and said back panel adjacent the intersection of said one side frame member with said back panel, said bar extending transversely between said front and back panels, means fixedly securing the other end of said bar to said front panel intermediate said side frame members, said bar having an undercut groove formed therein extending inwardly from its said other end, an elongated lock arm having a pair of opposed ends, means pivotally connecting one end of said lock arm on said bar, the other end of said lock arm being swingable within said undercut groove towards and away from said other end of said bar, means mounted on said other end of said bar constantly biasing said other end of said lock arm for swinging movement away from said other end of said bar, a block having a passage extending transversely therethrough, said other end of said bar extending through said passage to slidably mount said block thereon, said other end of said lock arm extending slidably through said passage with its said other end normally disposed in spaced relation relative to an adjacent portion of said other end of said bar under the influence of said biasing means, means on said lock arm and said block normally engaging one another to prevent relative movement between said block and said bar in one direction, an elongated brace having a pair of opposed ends, means pivotally connecting one end of said brace on said chassis adjacent said one door jamb, means pivotally connecting the other end of said brace on said block, the longitudinal axes of said bar and said block being disposed at an acute angle relative to one another whereby as said door is pivoted in one direction or the other said block reciprocates on said bar, and means mounted on said door operable to pivot said lock arm towards said other end of said bar to disengage said engaging means freeing said block for reciprocation on said bar to enable said door to freely pivot about its said pivotal connection.

2. A safety lock for a vehicle having a chassis including a pair of opposed laterally spaced upright door jambs, a door including a pair of opposed laterally spaced front and back panels, a pair of spaced and confronting side frame members, and means pivotally connecting said door adjacent one of said side frame members on one of said door jambs, said safety lock comprising an elongated bar having an end thereof fixedly secured to said one side frame member and said back panel adjacent the intersection of said one side frame member with said back panel, said bar extending transversely between said front and back panels, means fixedly securing the other end of said bar to said front panel intermediate said side frame members, said bar having an undercut groove formed therein extending inwardly from its said other end, an elongated lock arm having a pair of opposed ends, means pivotally connecting one end of said lock arm on said bar, the other end of said lock arm being swingable within said undercut groove towards and away from said other end of said bar, means mounted on said other end of said bar constantly biasing said other end of said lock arm for swinging movement away from said other end of said bar, a block having a passage extending transversely therethrough, said other end of said bar extending through said passage to slidably mount said block thereon, said other end of said lock arm extending slidably through said passage with its said other end normally disposed in spaced relation relative to an adjacent portion of said other end of said bar under the influence of said biasing means, means on said lock arm and said block normally confronting and engaging one another to prevent relative movement between said block and said bar in one direction, an elongated brace having a pair of opposed ends, means pivotally connecting one end of said brace on said chassis adjacent said one door jamb, means pivotally connecting the other end of said brace on said block, the longitudinal axes of said bar and said block being disposed at an acute angle relative to one another whereby as said door is pivoted in one direction or the other said block reciprocates on said bar, an elongated lock rod mounted for reciprocation on said bar and the other of said side frame members, said lock rod having an end thereof projecting beyond the outer side of said other side frame member and normally facing in the direction of said other of said door jambs, a keeper socket mounted on said other of said door jambs confronting and releasably receiving said projecting end of said lock rod, means mounted on said lock rod engageable with said other end of said lock arm as said lock rod is moved out of engagement with said keeper socket to effect pivotal movement of said lock arm towards said other end of said bar against the force of said biasing means to disengage said engaging means and to permit said block to reciprocate on said bar as said door is pivoted in either direction, and means on one of said panels connected with said lock rod to move said lock rod in one direction to effect its disengagement with said keeper socket.

3. A safety lock for a vehicle having a chassis including a pair of opposed laterally spaced upright door jambs, a door including a pair of opposed laterally spaced front and back panels, a pair of opposed spaced and confronting side frame members, and means pivotally connecting said door adjacent one of said side frame members on one of said door jambs, said safety lock comprising an elongated bar having an end thereof fixedly secured to said one side frame member and said back panel adjacent the intersection of said one side frame member with said back panel, said bar extending transversely between said front and back panels, a substantially U-shaped bracket including a pair of spaced and substantially parallel side arms and a bight connecting a pair of adjacent ends thereof, said other end of said bar being integrally connected with one of said side arms, means fixedly securing one of said side arms to said front panel intermediate said side frame members, said side arms each having a passage extending transversely therethrough and aligned with one another, said bar having an undercut groove formed therein extending inwardly from its said other end and aligned with said passages, an elongated lock arm having a pair of opposed ends, means pivotally connecting one end of said lock arm on said bar, the other end of said lock arm being extended in said groove and through said passages for movement therein towards and away from said other end of said bar, means mounted on one of said side arms constantly biasing said other end of said lock arm for swinging movement towards and away from said other end of said bar, a block having an opening extending transversely therethrough, said other end of said bar adjacent said U-shaped bracket extending through said opening to slidably mount said block thereon, said lock arm extending slidably through said opening with its said other end normally disposed in spaced relation relative to an adjacent portion of said other end of said bar and held in its said spaced relation under the influence of said biasing means, said block and said lock arm having a shoulder confronting and normally engaging one another to prevent relative movement between said block and said bar in one direction, an elongated brace having a pair of opposed ends, means pivotally connecting one end of said brace on said chassis adjacent said one door jamb, means pivotally connecting the other end of said brace on said block, the longitudinal axes of said bar in said block being disposed at an acute angle relative to one another whereby as said door is pivoted in one direction or the other said block reciprocates on said bar, an elongated lock rod mounted for reciprocation on the other of said side arms and the other of said side frame members, said lock rod having an end thereof projecting beyond the outer side of said other side frame member and normally facing in the direction of said other of said door jambs, a keeper socket mounted on said other end of said door jambs confronting and releasably receiving said projecting end of said lock rod, means mounted on said lock rod engageable with said other end of said lock arm as said lock rod is moved out of engagement with said keeper socket to effect pivotal movement of said lock arm towards said other end of said bar against the force of said biasing means to disengage said shoulders to permit said block to reciprocate on said bar as said door is pivoted in either direction, said cam means comprising a roller fixedly secured on said lock rod and engageable with said lock arm as said lock rod is reciprocated, means on the other of said side arms releasably engaging said lock rod to hold said lock rod in its retracted position relative to its said socket, means slidably mounted on said one of said side arms engageable with said other end of said brace and cooperating with said last-named means to release said lock rod for reengagement with said socket, and means on one of said panels connected with said lock rod to move said lock rod in one direction to effect its disengagement with its said socket.

4. A safety lock as defined in claim 3, said last-named means comprising a manually operable handle mounted on said back panel for pivotal movement thereon, a lever, means fixedly securing one end of said lever with said handle, a lug projecting laterally from the other end of said lever and having a centrally positioned aperture extending transversely therethrough, an elongated shaft having an end thereof mounted for reciprocation through said aperture, means interposed between said lug and means on said shaft constantly biasing said shaft for movement in one direction, a second lever pivotally mounted on said back panel, means connecting the other end to said shaft with said last-named lever intermediate the ends thereof, and means connecting one end of said last-named lever with said lock rod.

5. A safety lock as defined in claim 4, and a solenoid having an armature, push-button means mounted on said front panel to energize said solenoid, said armature having a shaft projecting axially therefrom, means connecting one end of said shaft with one end of said last-named lever, and means constantly biasing said last-named lever for movement in a direction away from said armature.

References Cited
UNITED STATES PATENTS

| | | | |
|---|---|---|---|
| 851,193 | 4/1907 | Younglove | 292—270 |
| 1,245,302 | 11/1917 | Ziehler. | |
| 1,600,171 | 9/1926 | Hixon | 292—262 |
| 3,100,122 | 8/1963 | Knapp. | |
| 3,106,418 | 10/1963 | Knapp. | |

FOREIGN PATENTS 444,854   8/1912   France.

MARVIN A. CHAMPION, *Primary Examiner.*
RICHARD E. MOORE, *Examiner.*